United States Patent
Sekine

(10) Patent No.: US 9,692,983 B2
(45) Date of Patent: Jun. 27, 2017

(54) APPARATUS, METHOD, AND MEDIUM FOR CORRECTING PIXEL SWITCHING PATTERN

(71) Applicant: CANON KABUSHIKI KAISHA, Tokyo (JP)

(72) Inventor: Hisato Sekine, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 75 days.

(21) Appl. No.: 14/657,089

(22) Filed: Mar. 13, 2015

(65) Prior Publication Data
US 2015/0271382 A1 Sep. 24, 2015

(30) Foreign Application Priority Data
Mar. 19, 2014 (JP) ................................. 2014-056494

(51) Int. Cl.
H04N 5/235 (2006.01)
H04N 5/243 (2006.01)
H04N 5/353 (2011.01)

(52) U.S. Cl.
CPC ......... *H04N 5/2353* (2013.01); *H04N 5/2351* (2013.01); *H04N 5/243* (2013.01); *H04N 5/3535* (2013.01)

(58) Field of Classification Search
None
See application file for complete search history.

(56) References Cited

U.S. PATENT DOCUMENTS

| | | | |
|---|---|---|---|
| 2008/0180556 A1* | 7/2008 | Egawa | H04N 9/045 348/294 |
| 2008/0278596 A1* | 11/2008 | Machida | H04N 5/335 348/222.1 |
| 2009/0122165 A1* | 5/2009 | Kinoshita | H04N 5/359 348/241 |
| 2010/0141792 A1* | 6/2010 | Arai | H04N 5/23248 348/229.1 |
| 2012/0020569 A1* | 1/2012 | Mita | G06K 9/38 382/199 |

(Continued)

FOREIGN PATENT DOCUMENTS

| | | |
|---|---|---|
| JP | 07-131796 | 5/1995 |
| JP | 3495768 B2 | 11/2004 |
| JP | 2010-136205 | 6/2010 |

*Primary Examiner* — Twyler Haskins
*Assistant Examiner* — Wesley Chiu
(74) *Attorney, Agent, or Firm* — Fitzpatrick, Cella, Harper & Scinto

(57) ABSTRACT

The present invention is a control apparatus for controlling an image capturing sensor, the control apparatus comprising: a generation unit configured to selectively determine an exposure time from at least two or more different exposure times for each pixel constituting image data and to generate exposure time data indicative of an exposure time for each pixel; and a gain adjustment processing unit configured to make a gain adjustment to the image data based on the determined exposure time, wherein the generation unit calculates an output value from acquired image data, determines an exposure time for each pixel based on the calculated output value, calculates an error related to the calculated output value, and diffuses the calculated error to pixels adjacent to a processing-target pixel, thereby turning a pixel switching pattern into a blue noise pattern.

4 Claims, 12 Drawing Sheets

(56) References Cited

U.S. PATENT DOCUMENTS

2012/0020584 A1* 1/2012 Yoshizawa ........... H04N 1/4052
       382/274
2012/0257840 A1* 10/2012 Yoshizawa ........... H04N 1/4052
       382/261

* cited by examiner

APPARATUS, METHOD, AND MEDIUM FOR CORRECTING PIXEL SWITCHING PATTERN

BACKGROUND OF THE INVENTION

Field of the Invention

The present invention relates to an apparatus, a method, and a medium. Specifically, the present invention relates to an apparatus, a method, and a medium for acquiring a high dynamic range image.

Description of the Related Art

It is known generally that the dynamic range of an image capturing sensor that is used in an image capturing apparatus such as a digital camera is narrow compared to the dynamic range of the natural world. Because of this, in the case where a scene having a wide dynamic range (referred to as a high dynamic range, which is abbreviated to "HDR" in the present specification) is photographed by the normal method, blocked up shadows or white saturation occurs. Consequently, various methods are discussed for acquiring HDR image data.

In a general method, an image obtained by photographing the same subject with a long exposure time (long-time exposed image) and an image obtained by photographing the same subject with a short exposure time (short-time exposed image) are acquired. Then, there is a method of acquiring HDR image data by using a long-time exposed image for a dark area and a short-time exposed image for alight area (see Japanese Patent No. 3495768).

Further, there is a method of acquiring HDR image data by determining the exposure time of each pixel based on the results of preliminary photographing by using a sensor capable of controlling the exposure time for each pixel (Japanese Patent Laid-Open No. 2010-136205).

In the methods disclosed in Japanese Patent No. 3495768 and Japanese Patent Laid-Open No. 2010-136205, a gain adjustment in accordance with the exposure time is made to the photographed data that is acquired and HDR combination is performed by switching images that are used for each pixel. At this time, it is required for the luminance response of the image capturing sensor to be linear. However, in the case where there is a nonlinear response in the vicinity of the rise or in the vicinity of saturation of the luminance response of the image capturing sensor as shown in FIG. 12, a gap is produced in the vicinity of the portion of switching and a pseudo contour occurs. In addition, also in the case where noise characteristics are different in the vicinity of the rise or in the vicinity of saturation, a gap between the noise characteristics is produced in the vicinity of the portion of switching and a pseudo contour occurs. Because of this, Japanese Patent No. 3495768 has proposed a method of reducing the occurrence of a pseudo contour by overlapping luminance areas that are acquired at the time of performing photographing while changing the exposure time and by smoothly making the change by weighted addition at the time of switching images. Further, as disclosed in Japanese Patent Laid-Open No. 2010-136205, a method that uses only the linear response area is also disclosed.

SUMMARY OF THE INVENTION

However, by the method of overlapping the luminance areas that are acquired as in Japanese Patent No. 3495768, the pseudo contour can be reduced, but blurring due to the weighted addition occurs. By the method that uses only the linear response area as in Japanese Patent Laid-Open No. 2010-136205, the dynamic range that is acquired is narrow. As a result of this, the number of times of photographing and the number of kinds of photographing at the time of performing photographing while changing the exposure time are increased.

The present invention is a control apparatus for controlling an image capturing sensor, the control apparatus comprising: a generation unit configured to selectively determine an exposure time from at least two or more different exposure times for each pixel constituting image data and to generate exposure time data indicative of an exposure time for each pixel; and a gain adjustment processing unit configured to make a gain adjustment to the image data based on the determined exposure time, wherein the generation unit calculates an output value from acquired image data, determines an exposure time for each pixel based on the calculated output value, calculates an error related to the calculated output value, and diffuses the calculated error to pixels adjacent to a processing-target pixel, thereby turning a pixel switching pattern into a blue noise pattern.

According to the present invention, it is made possible to acquire HDR image data with the number of times of photographing as small as possible and with the number of kinds of photographing as small as possible while reducing the occurrence of a pseudo contour at the time of acquiring image data by photographing a scene having a high dynamic range.

Further features of the present invention will become apparent from the following description of exemplary embodiments (with reference to the attached drawings).

DESCRIPTION OF THE EMBODIMENTS

First Embodiment

First, an outline of a first embodiment is explained. In the present embodiment, a method of acquiring an HDR image by making a gain adjustment to data of a photographed image for each pixel by using an image capturing sensor capable of setting a plurality of kinds of exposure times for each pixel is described. At this time, which exposure time is selected for each pixel is determined by using the error diffusion method based on the results of preliminary photographing and the luminance response characteristics of the image capturing sensor. Due to this, the dynamic range is maintained even in the case where the luminance responses of the image capturing sensor include a nonlinear response. In addition, the occurrence of a pseudo contour that occurs resulting from the nonlinear luminance response is suppressed by turning a switching pattern of exposure times for each pixel at the time of performing photographing under photographing conditions that the exposure time differs from pixel to pixel into a high-frequency pattern (blue noise pattern) that is unlikely to be perceived by a human being. In the present embodiment, for the sake of simplicity, it is assumed that the image capturing sensor can set two kinds of exposure times, i.e., a long exposure time and a short exposure time, and that the short exposure time is set to half the long exposure time.

Figure 1A:
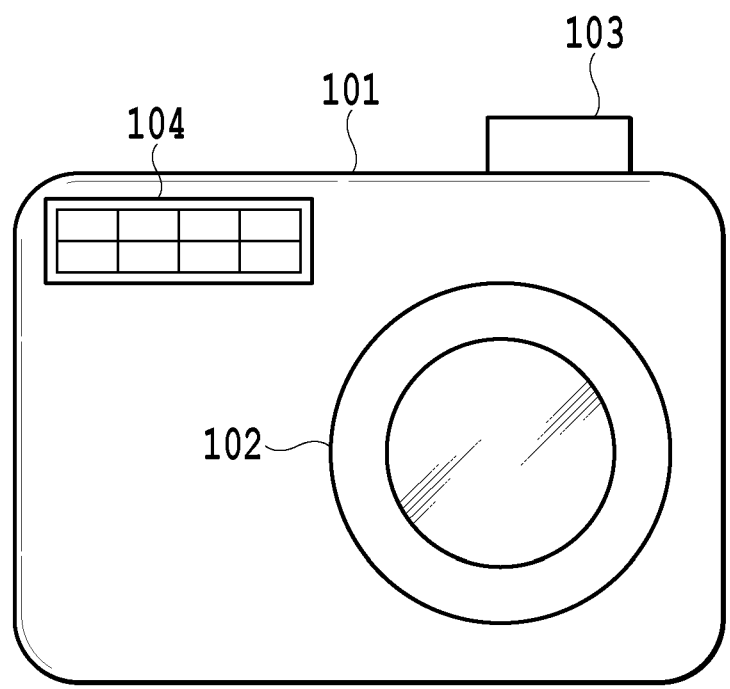
FIG. 1A and FIG. 1B are outline configuration diagrams of an image capturing apparatus in a first embodiment and a second embodiment.
Figure 1B:
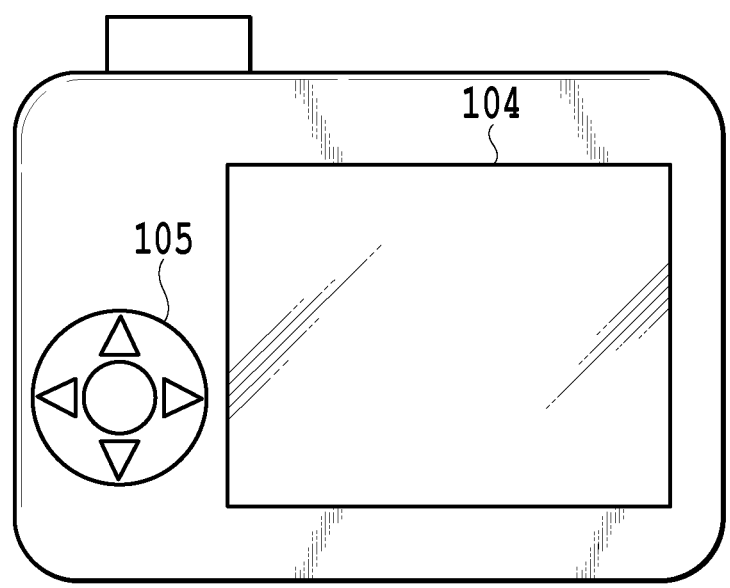

FIG. 1A and FIG. 1B are outline configuration diagrams of an image capturing apparatus in the present embodiment, and FIG. 1A is a front view and FIG. 1B is a rear view. An image capturing apparatus 101 includes an optical unit 102, a photographing button 103, a display unit 104, and an operation button 105. The optical unit 102 includes a zoom lens, a focus lens, a camera-shake correction lens, an aperture, and a shutter and acquires light information on a subject by collecting light. The photographing button 103 is a button with which a user gives instructions to start photographing to the image capturing apparatus 101. The display unit 104 is implemented by using a liquid crystal display, etc., and displays image data on which processing has been performed in the image capturing apparatus 101 including various kinds of data. The operation button 105 is a button with which a user specifies photographing conditions (specifically, photographing parameters, such as an aperture and a shutter speed) to the image capturing apparatus 101.

Figure 2:
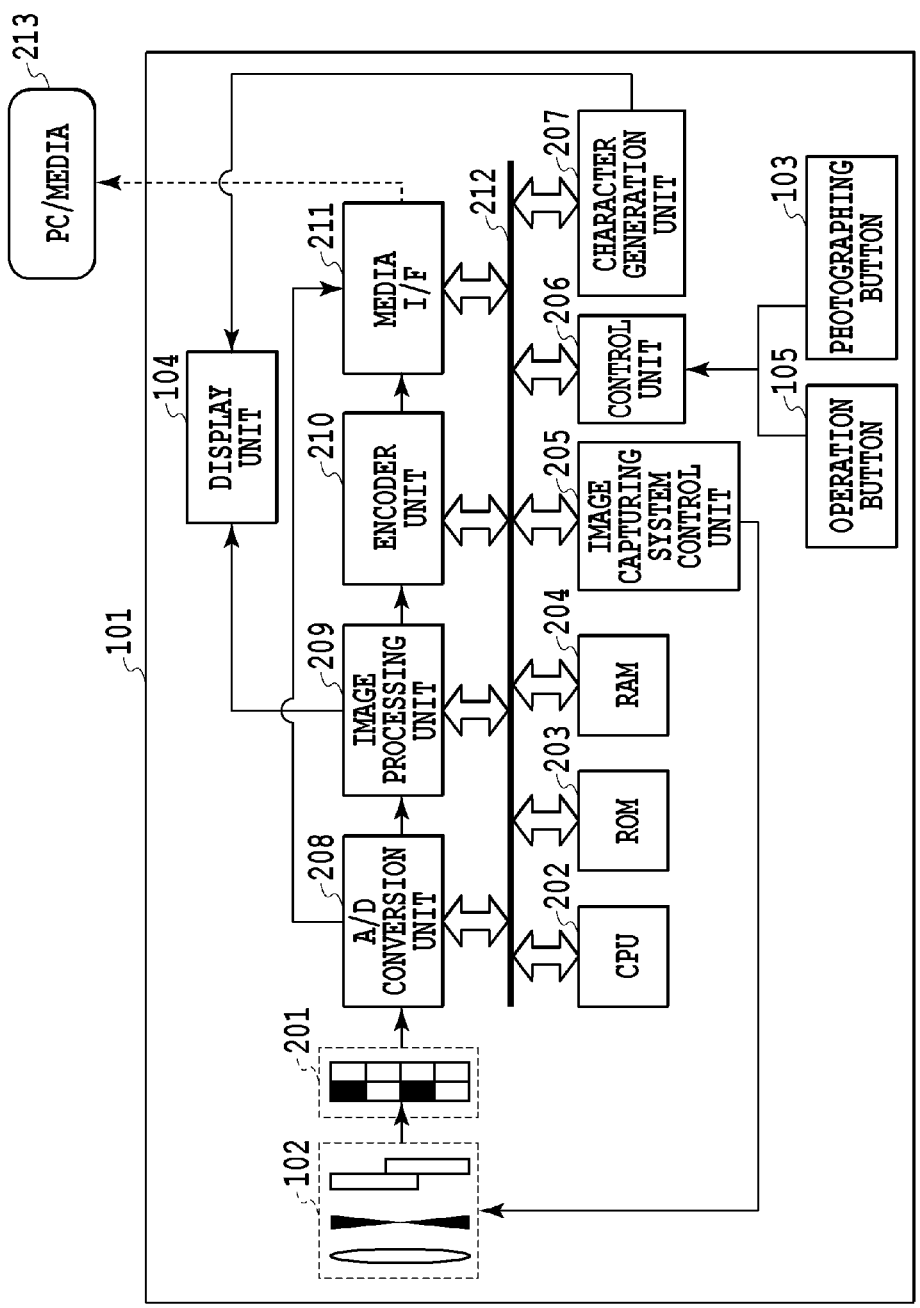
FIG. 2 is a block diagram showing an internal configuration of the image capturing apparatus in the first embodiment and the second embodiment.

FIG. 2 is a block diagram showing an internal configuration of the image capturing apparatus 101 in the present embodiment. A color image capturing element unit 201 is an element that converts light information acquired by the optical unit 102 into a current value, and acquires color information in combination with a color filter etc. The color image capturing element unit 201 is an image capturing sensor capable of setting any exposure time for each pixel and in the present embodiment, it is possible for the image capturing sensor to selectively set one of the two kinds of exposure to each pixel. Exposure by a long exposure time of the two kinds of exposure is called "long exposure" and exposure by a short exposure time is called "short exposure". It is assumed that the exposure time of the long exposure is a reference exposure time at the time of photographing set in advance and the exposure time of the short exposure is set to half the exposure time of the long exposure. A CPU 202 is related to all the processing of each configuration within the image capturing apparatus 101, and sequentially reads and interprets commands stored in a ROM (Read Only Memory) 203 or a RAM (Random Access Memory) 204 and performs processing in accordance with the results. An image capturing system control unit 205 performs control of the optical unit 102 specified by the CPU 202, such as focusing, releasing a shutter, and adjusting an aperture. A control unit 206 performs control of starting and ending of the photographing operation in accordance with the user's instructions through the photographing button 103 and the operation button 105. A character generation unit 207 generates characters and graphics. An A/D conversion unit 208 converts an amount of light (analog value) of a subject acquired via the optical unit 102 and the color image capturing element unit 201 into a digital signal value. An image processing unit 209 performs image processing on image data after the A/D conversion. An encoder unit 210 converts image data on which processing has been performed in the image processing unit 209 into a file format such as Jpeg. A media I/F 211 is an interface for transmitting and receiving image data to and from PC/media 213 (e.g., a hard disk, a memory card, a CF card, an SD card, etc.). A system bus 212 is a bus through which each configuration transmits and receives data.

Figure 3:
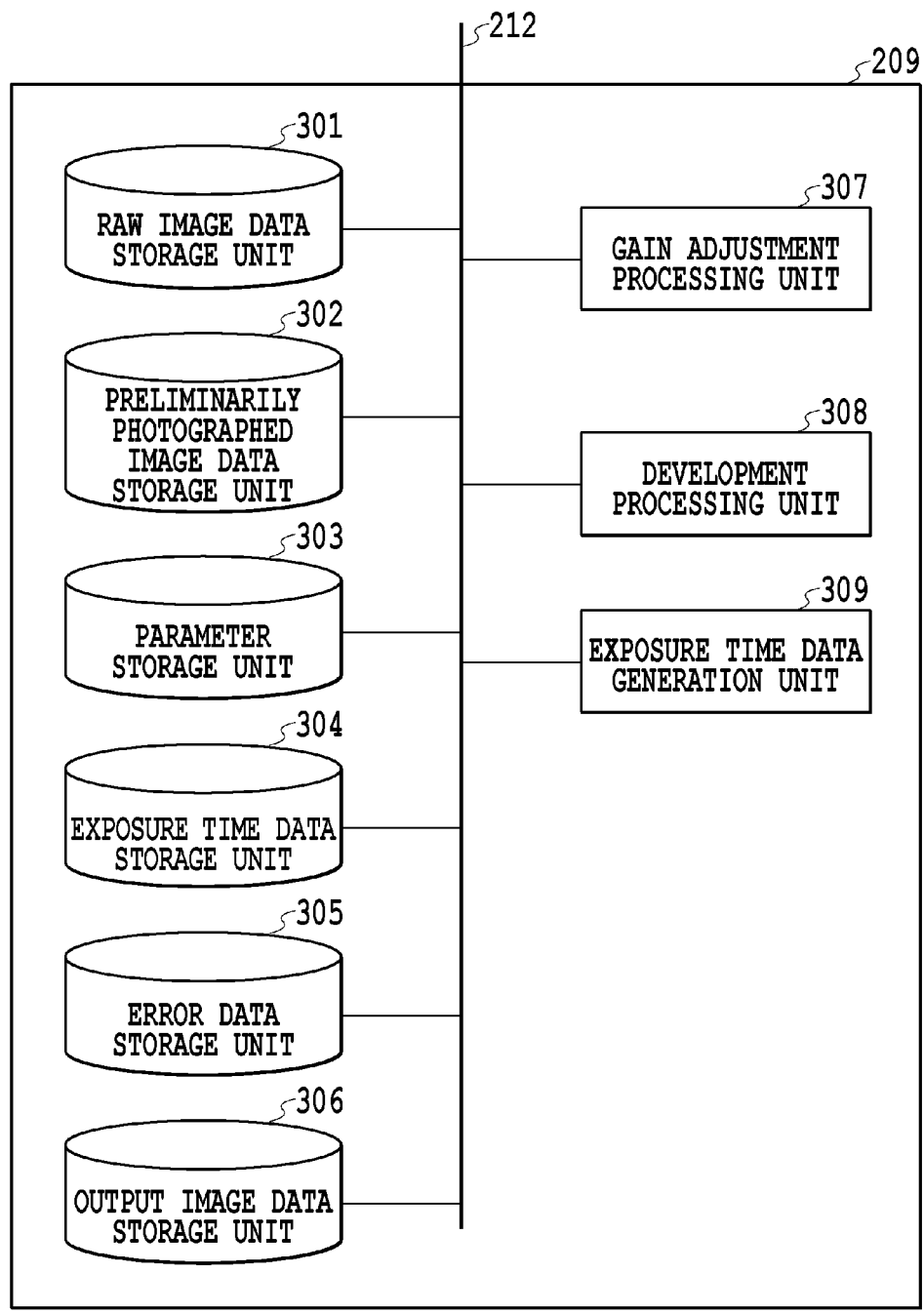
FIG. 3 is a block diagram showing an internal configuration of an image processing unit in the first embodiment.

FIG. 3 is a block diagram showing an internal configuration of the image processing unit 209 in the present embodiment. A RAW image data storage unit 301 stores image data generated by the A/D conversion unit 208 turning light information on a subject acquired by the color image capturing unit 201 by the photographing operation into a digital signal value. A preliminarily photographed image data storage unit 302 stores image data acquired by preliminary photographing. A parameter storage unit 303 stores parameters necessary in the development processing, threshold value data that is necessary at the time of generating exposure time data, etc. Details of calculation of the exposure time will be described later. An exposure time data storage unit 304 stores exposure time data indicative of the exposure time for each pixel. An error data storage unit 305 stores error data indicative of an error for each pixel. An output image data storage unit 306 stores image data that is output ultimately. A gain adjustment processing unit 307 makes a gain adjustment to input image data based on the exposure time data stored in the exposure time data storage unit 304. A development processing unit 308 performs development processing, such as white balance processing, demosaicking processing, noise reduction, color conversion, and gamma processing, on the RAW image data stored in the RAW image data storage unit 301. An exposure time data generation unit 309 generates exposure time data by determining the exposure time for each pixel based on the preliminarily photographed image data stored in the preliminarily photographed image data storage unit 302.

Figure 4:
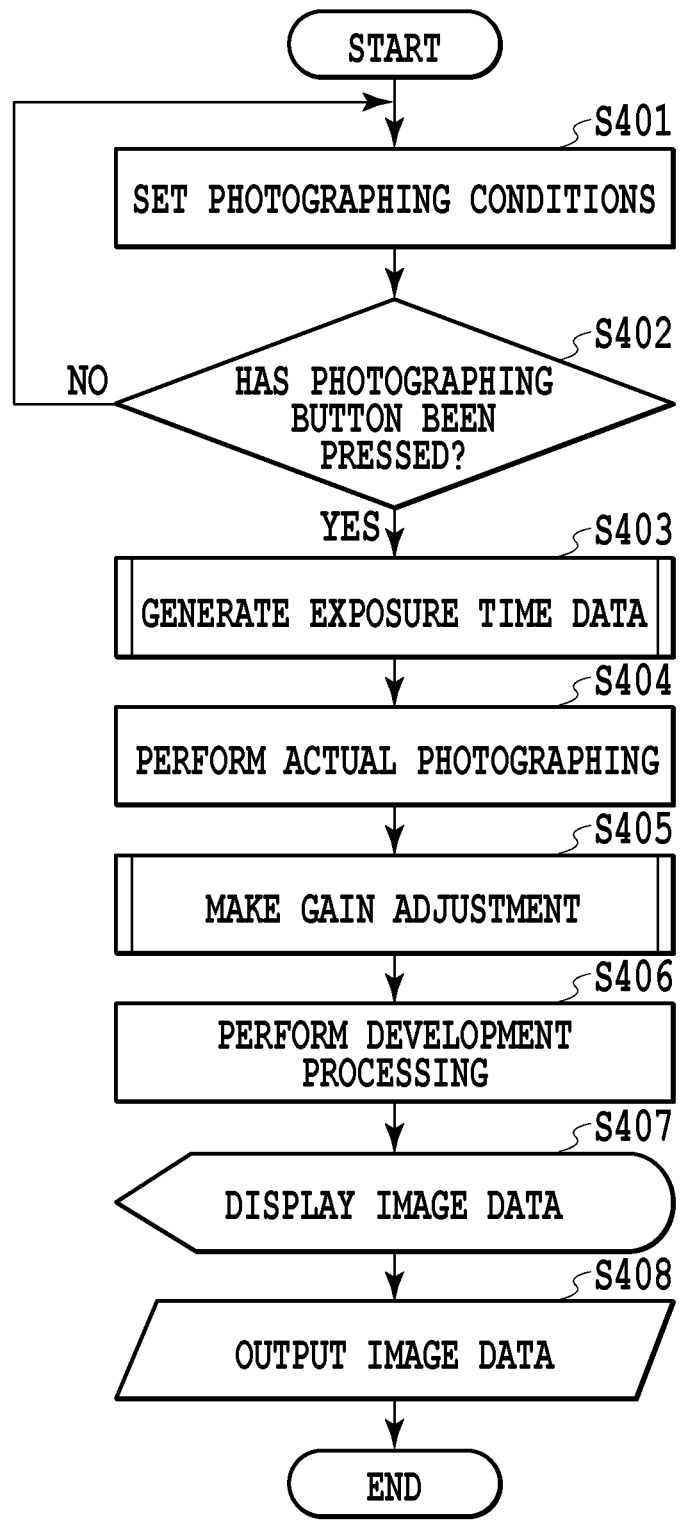
FIG. 4 is a flowchart of the entire processing in the first embodiment.

FIG. 4 is a flowchart of the entire processing in the present embodiment.

First, at step S401, a user inputs photographing parameters, such as a shutter speed and an f-stop, by using the operation button 105 and sets photographing conditions. Next, the processing proceeds to step S402.

At step S402, the CPU 202 determines whether the photographing button 103 has been pressed. In the case where the results of the determination indicate that the photographing button 103 has been pressed, the processing proceeds to step S403 and in the case where the photographing button 103 has not been pressed, the processing returns to step S401.

At step S403, the image processing unit 209 (the exposure time data generation unit 309) generates exposure time data indicative of the exposure time for each pixel (details will be described later). Next, the processing proceeds to step S404.

At step S404, the image capturing apparatus 101 performs actual photographing based on the photographing conditions (photographing parameters) set at step S401. In the actual photographing, the image capturing system control unit 205 acquires the amount of light of a subject by driving the optical unit 102, the A/D conversion unit 208 converts the acquired light information on a subject into RAW image data, and the RAW image data is stored in the RAW image data storage unit 301. Next, the processing proceeds to step S405.

At step S405, the image processing unit 209 (the gain adjustment processing unit 307) makes the gain adjustment to the RAW image data stored in the RAW image data storage unit 301 at step S404 (details will be described later). Next, the processing proceeds to step S406.

At step S406, the development processing unit 308 performs development processing on the RAW image data to which the gain adjustment has been made at step S405. The image data after the development is stored in the output image data storage unit 306. Next, the processing proceeds to step S407.

At step S407, the display unit 104 displays the image data stored in the output image data storage unit 306 at step S406. A user selects image data to be output based on the image data displayed on the display unit 104. Next, the processing proceeds to step S408.

At step S408, the image capturing apparatus 101 converts the image data displayed on the display unit 104 at step S407 into a file format such as Jpeg by the encoder unit 210 and outputs the file format to the PC/media 213 via the media I/F 211.

<Generation of Exposure Time Data>

The generation of exposure time data at step S403 in FIG. 4 is explained in detail. In the present processing, the setting is done so that short photographing is performed at the time of the actual photographing for the pixel having an output value equal to or greater than a set threshold value based on the results of preliminary photographing. At this time, the error that is a difference between the output value and the threshold value is diffused to the adjacent pixels. Due to this processing, the switching pattern between the pixel for which short photographing is performed and the pixel for which long photographing is performed becomes a blue noise pattern that is unlikely to be visually recognized by a human being and as a result of this, it is possible to suppress the occurrence of a pseudo contour.

Figure 5:
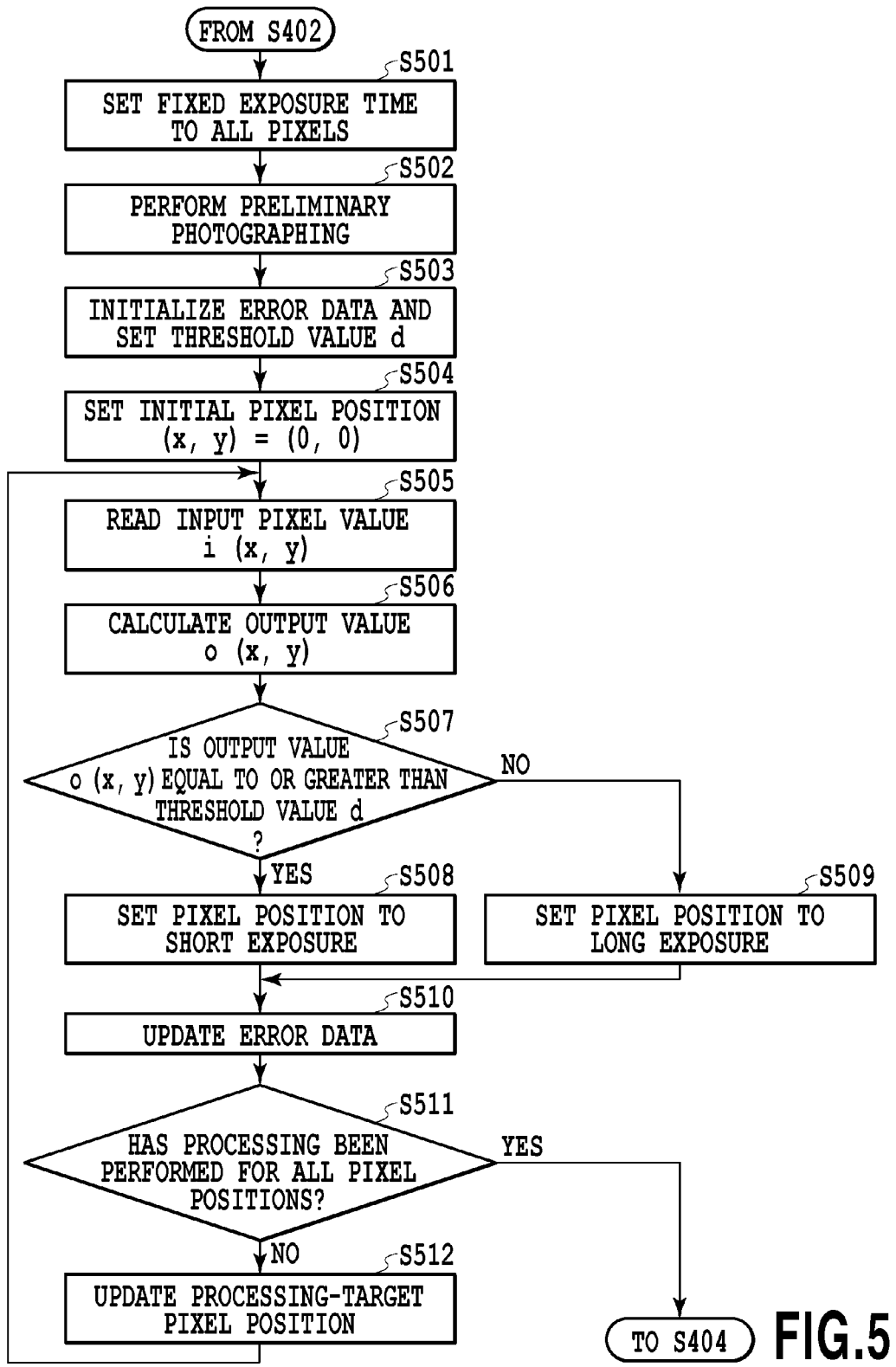
FIG. 5 is a detailed flowchart of exposure time data generation processing in the first embodiment.

Hereinafter, exposure time data generation processing is explained by using FIG. 5. FIG. 5 is a detailed flowchart of the exposure time data generation processing at step S403.

First, at step S501, the exposure time data generation unit 309 sets the exposure time that has been set at step S401 to all the pixels. Next, the processing proceeds to step S502.

At step S502, the image capturing apparatus 101 performs preliminary photographing in accordance with the exposure time set at step S501. The image data acquired as the results of the preliminary photographing is stored in the preliminarily photographed image data storage unit 302. Next, the processing proceeds to step S503.

At step S503, the exposure time data generation unit 309 initializes all error values $\Delta(x,y)$ constituting the error data stored in the error data storage unit 305 to 0 and further sets a threshold value d. Here, the error value $\Delta(x,y)$ is an error value at a pixel position $(x,y)$. The threshold value d is set to a value at which the luminance response characteristics of the image capturing sensor lose linearity. Next, the processing proceeds to step S504.

At step S504, the exposure time data generation unit 309 sets $(x,y)=(0,0)$ as the initial pixel position of a processing-target pixel. Next, the processing proceeds to step S505.

At step S505, the exposure time data generation unit 309 reads a pixel value $i(x,y)$ at the processing-target pixel position of the preliminarily photographed image data stored in the preliminarily photographed image data storage unit 302. Next, the processing proceeds to step S506.

At step S506, the exposure time data generation unit 309 calculates an output value O based on the error value $\Delta(x,y)$ at the processing-target pixel position of the error data by using expression (1). Next, the processing proceeds to step S507.

$$O=i(x,y)+\Delta(x,y) \quad \text{expression (1)}$$

At step S507, the exposure time data generation unit 309 determines whether the output value O is equal to or greater than the threshold value d. In the case where the results of the determination indicate that the output value O is equal to or greater than the threshold value d, the processing proceeds to step S508 and in other cases, the processing proceeds to step S509.

At step S508, the exposure time data generation unit 309 sets the exposure time for the processing-target pixel position $(x,y)$ of the exposure time data stored in the exposure time data storage unit 304 to the exposure time for short exposure. Next, the processing proceeds to step S510.

At step S509, the exposure time data generation unit 309 sets the exposure time for the processing-target pixel position $(x,y)$ of the exposure time data stored in the exposure time data storage unit 304 to the exposure time for long exposure. Next, the processing proceeds to step S510.

At step S510, the exposure time data generation unit 309 updates the error data (details will be described later). Next, the processing proceeds to step S511.

At step S511, the exposure time data generation unit 309 determines whether the processing at steps S505 to S510 has been performed for all the pixel positions. In the case where the results of the determination indicate that the processing at steps S505 to S510 has been performed for all the pixel positions, the processing proceeds to step S404 and in other cases, the processing proceeds to step S512.

At step S512, the exposure time data generation unit 309 updates the processing-target pixel position. Next, the processing returns to step S505.

<Updating of Error Data>

Figure 6B:
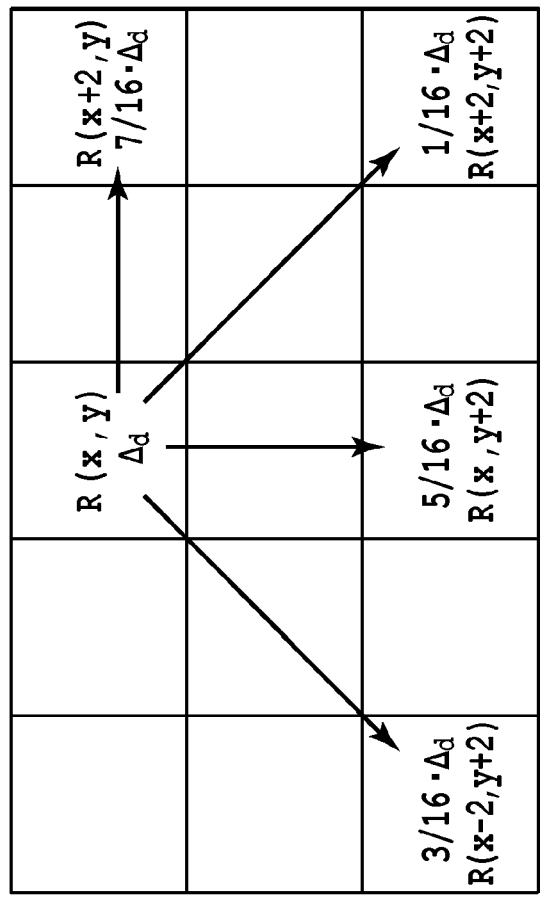
FIG. 6A and FIG. 6B are diagrams for explaining an updating of error data in the first embodiment.
Figure 6A:
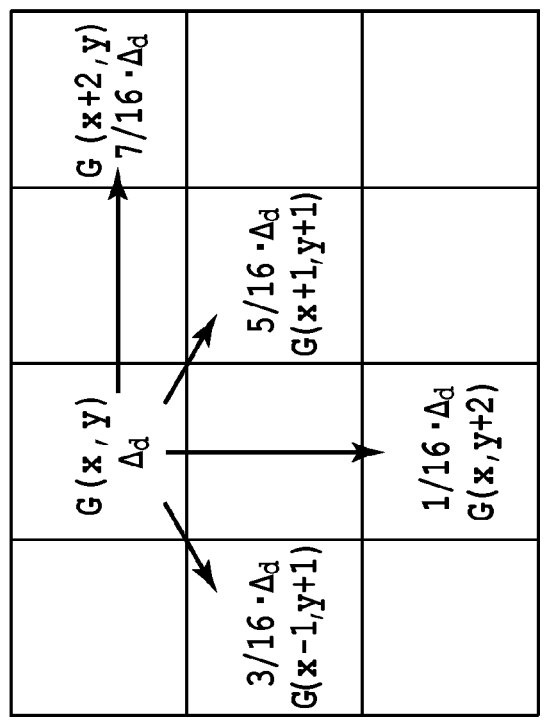

The updating of error data at step S510 in FIG. 5 is explained in detail by using FIG. 6A and FIG. 6B. In the present embodiment, after the threshold value processing at step S507, an error $\Delta d$ between the output value and the threshold value is calculated and the exposure time for each pixel is set while diffusing the error $\Delta d$ to the positions adjacent to the processing-target pixel by the error diffusion method. In this processing, first, the error $\Delta d$ at the processing-target pixel position is calculated by using expression (2).

$$\Delta d = i(x,y)+\Delta(x,y)-d \quad \text{expression (2)}$$

Next, the calculated error $\Delta d$ is diffused to the adjacent pixels. At this time, generally, the RAW image data has the Bayer array in which each pixel has only one color. Because of this, it is necessary to diffuse the error $\Delta d$ to the pixels that have the same color as that of the pixel for which the error has been calculated. FIG. 6A shows the error diffusion method in the case where the processing-target pixel is green (G). In FIG. 6A, the pixel in green (G) at the pixel position $(x,y)$ is denoted by $G(x,y)$. As shown in FIG. 6A, the error $\Delta d$ at the processing-target pixel position $(x,y)$ is diffused as shown by expression (3) to expression (6).

$$\Delta(x+2,y) \mathrel{+}= 7/16 * \Delta d \quad \text{expression (3)}$$

$$\Delta(x-1,y+1) \mathrel{+}= 3/16 * \Delta d \quad \text{expression (4)}$$

$$\Delta(x+1,y+1)+=5/16*\Delta d \qquad \text{expression (5)}$$

$$\Delta(x,y+2)+=1/16*\Delta d \qquad \text{expression (6)}$$

FIG. 6B shows the error diffusion method in the case where the processing-target pixel is red (R). In FIG. 6B, the pixel in red (R) at the pixel position (x, y) is denoted by R (x, y). As shown in FIG. 6B, the error Δd at the processing-target pixel position (x, y) is diffused as shown by expression (7) to expression (10).

$$\Delta(x+2,y)+=7/16*\Delta d \qquad \text{expression (7)}$$

$$\Delta(x-2,y+2)+=3/16*\Delta d \qquad \text{expression (8)}$$

$$\Delta(x,y+2)+=5/16*\Delta d \qquad \text{expression (9)}$$

$$\Delta(x+2,y+2)+=1/16*\Delta d \qquad \text{expression (10)}$$

<Gain Adjustment>

Figure 7:
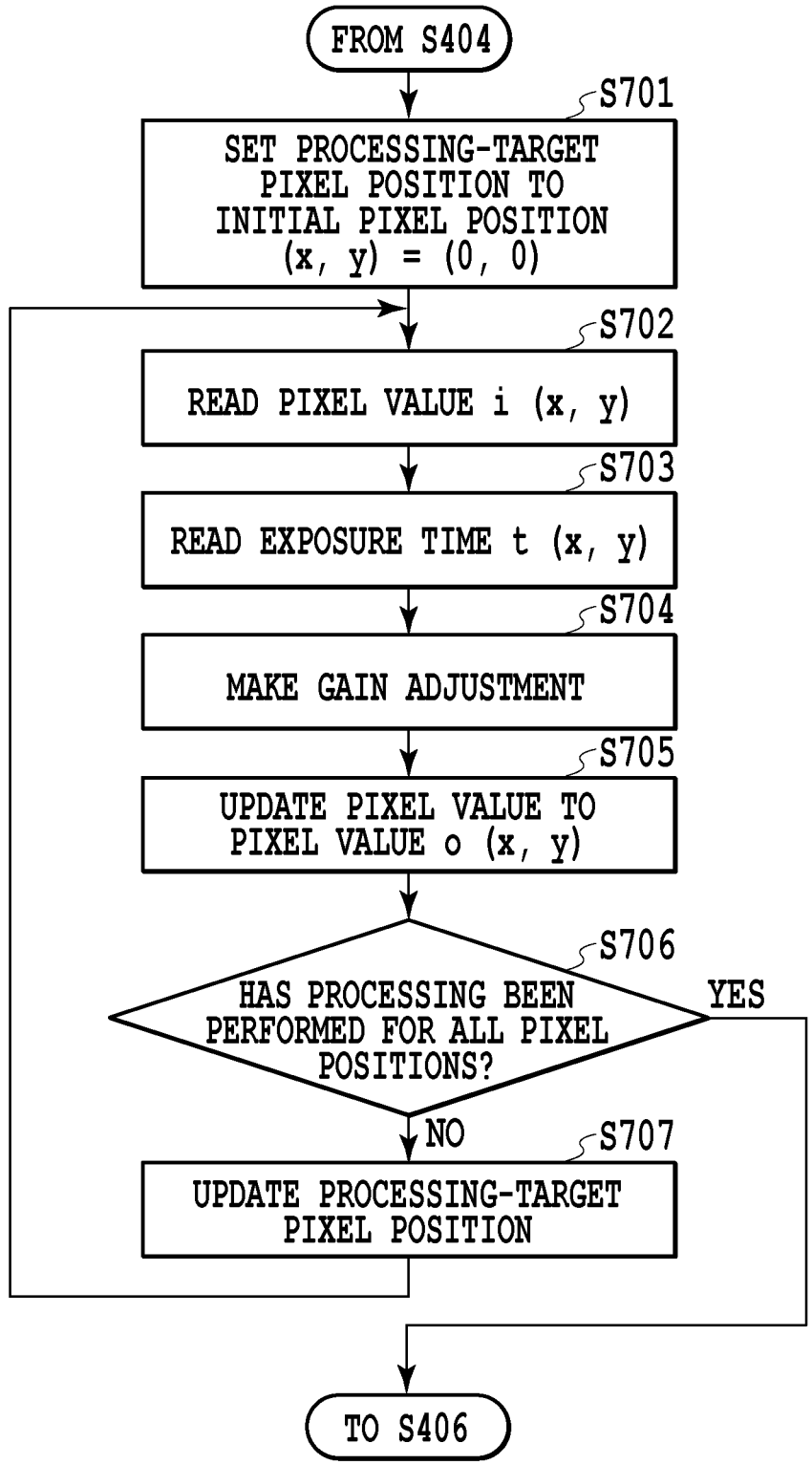
FIG. 7 is a detailed flowchart of gain adjustment processing in the first embodiment.

The gain adjustment at step S405 in FIG. 4 is explained in detail by using FIG. 7. FIG. 7 is a detailed flowchart of the gain adjustment processing at step S405.

First, at step S701, the gain adjustment processing unit 307 initializes the processing-target pixel position and sets (x, y)=(0, 0). Next, the processing proceeds to step S702.

At step S702, the gain adjustment processing unit 307 reads the pixel value i (x, y) at the processing-target pixel position of the RAW image data stored in the RAW image data storage unit 301. Next, the processing proceeds to step S703.

At step S703, the gain adjustment processing unit 307 reads an exposure time t (x, y) at the processing-target pixel position of the exposure time data stored in the exposure time data storage unit 304. Next, the processing proceeds to step S704.

At step S704, the gain adjustment processing unit 307 calculates an output pixel value o (x, y) after the gain adjustment based on the pixel value i (x, y), the exposure time t (x, y), and a reference exposure time t0 by using expression (11). Here, in the present embodiment, it is assumed that the reference exposure time=the exposure time of the long exposure. Next, the processing proceeds to step S705.

$$o(x,y)=i(x,y)/t(x,y)*t0 \qquad \text{expression (11)}.$$

At step S705, the gain adjustment processing unit 307 updates the pixel value at the processing-target pixel position of the RAW image data stored in the RAW image data storage unit 301 to the pixel value o (x, y) after the gain adjustment that has been calculated at step S704. Next, the processing proceeds to step S706.

At step S706, the gain adjustment processing unit 307 determines whether the processing at steps S702 to S705 has been performed for all the pixel positions. In the case where the results of the determination indicate that the processing at steps S702 to S705 has been performed for all the pixel positions, the processing proceeds to step S406 and in other cases, the processing proceeds to step S707.

At step S707, the gain adjustment processing unit 307 updates the processing-target pixel position. Next, the processing returns to step S702.

By performing the processing explained above, it is made possible to reduce the pseudo contour that occurs resulting from the nonlinear response to the luminance of the sensor at the time of acquiring the HDR image data by using an image capturing sensor capable of controlling the exposure time for each pixel.

In the present embodiment, explanation is given by using the case where there are two exposure times (i.e., the exposure time of the long exposure and the exposure time of the short exposure) that can be set for each pixel as an example, but the number of exposure times is not limited to this example. Even in the case where the exposure time can be set in three steps or four steps, it is possible to implement the present invention by the same processing.

In the present embodiment, the method is explained, which turns the exposure time switching pattern into a blue noise pattern by diffusing the error to the pixels adjacent to the processing-target pixel by using the error diffusion method, but a method that diffuses the error to the pixels adjacent to the processing-target pixel by using the dither method, etc., may be accepted.

Second Embodiment

In the first embodiment, the method of acquiring HDR image data by using an image capturing sensor capable of controlling the exposure time for each pixel is explained. In contrast to this, in the present embodiment, HDR image data is acquired by combining a plurality of pieces of image data acquired by performing photographing a plurality of times while changing the exposure time by using a general image capturing sensor. The configuration of the image capturing apparatus according to the present embodiment is the same as that of the first embodiment, and therefore, explanation is omitted (see FIG. 1A and FIG. 1B). Further, the internal configuration of the image capturing apparatus according to the present embodiment is the same as that of the first embodiment, and therefore, explanation is omitted (see FIG. 2). Hereinafter, the present embodiment is explained by mainly focusing on points different from those of the first embodiment.

Figure 8:
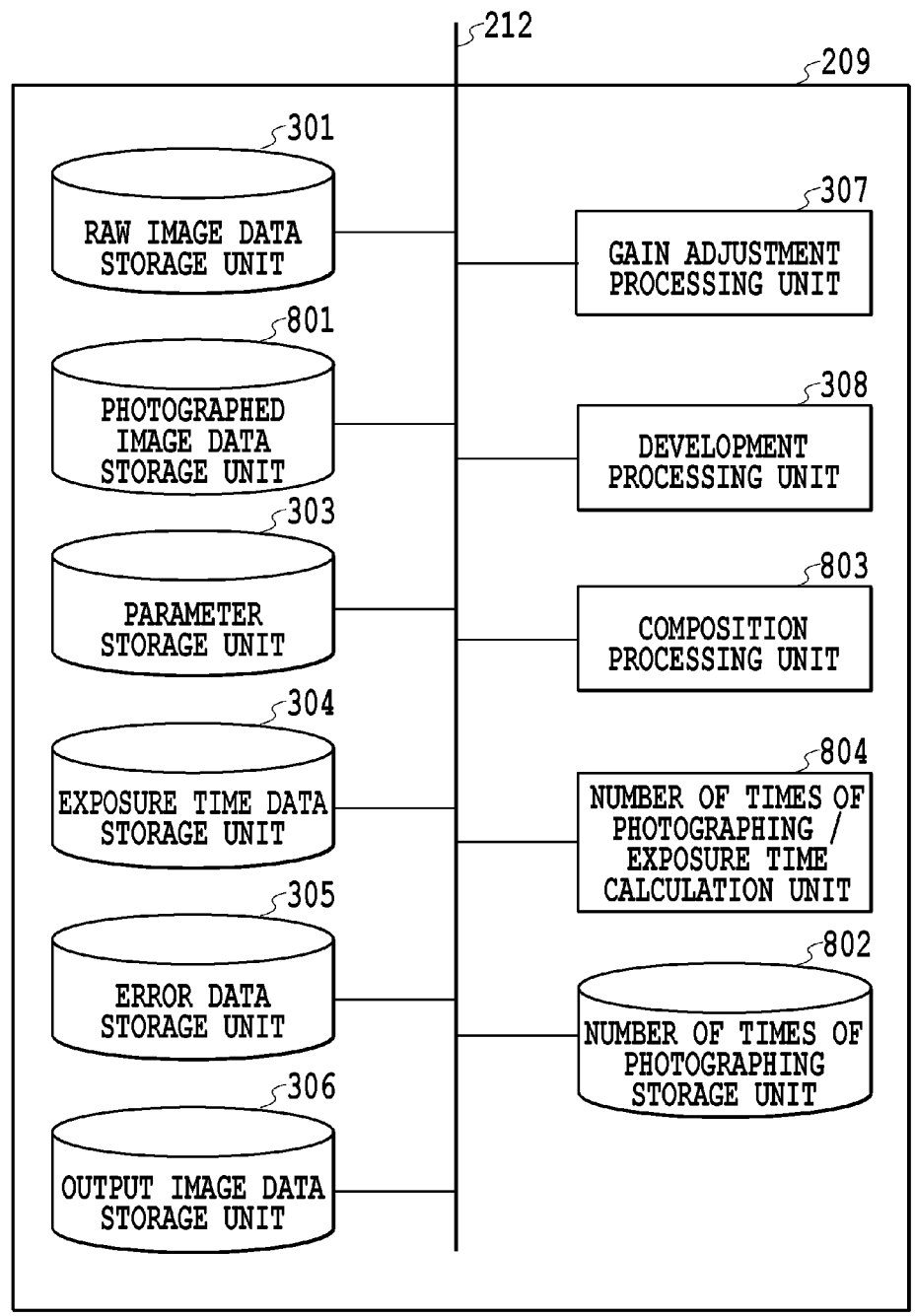
FIG. 8 is a block diagram showing an internal configuration of image processing unit in the second embodiment.

FIG. 8 is a diagram showing an internal configuration of the image processing unit 209 in the present embodiment. The image processing unit 209 includes the RAW image data storage unit 301, the parameter storage unit 303, the exposure time data storage unit 304, the error data storage unit 305, the output image data storage unit 306, the gain adjustment processing unit 307, and the development processing unit 308 as in the first embodiment. However, the image processing unit 209 in the present embodiment also includes a photographed image data storage unit 801, a number of times of photographing storage unit 802, a combination processing unit 803, and a number of times of photographing/exposure time calculation unit 804, and in this point, the image processing unit 209 in the present embodiment differs from that of the first embodiment. The photographed image data storage unit 801 stores data of an image that has been photographed and on which development processing has been performed. The number of times of photographing storage unit 802 stores the number of times of photographing. The combination processing unit 803 combines a plurality of pieces of photographed image data acquired by performing photographing a plurality of times with different exposure times. The number of times of photographing/exposure time calculation unit 804 calculates the number of times of photographing and the exposure time for each photographing necessary to acquire HDR image data.

Figure 9:
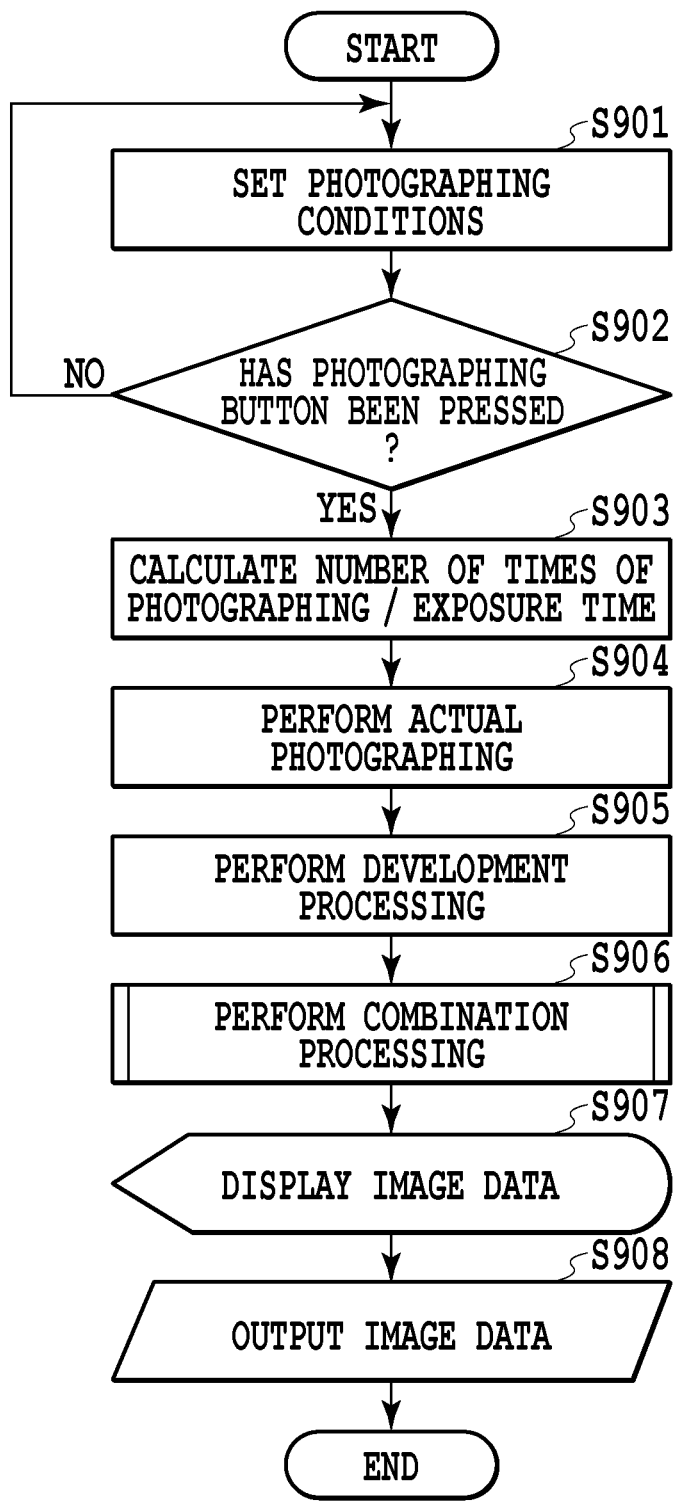
FIG. 9 is a flowchart of the entire processing in the second embodiment.

FIG. 9 is a flowchart of the entire processing in the present embodiment.

First, at step S901, a user sets photographing conditions by inputting photographing parameters, such as the maximum luminance, the f-stop, the focus length, and the ISO speed, that the user desires to implement at the time of photographing a scene that is a target of photographing and which has a high dynamic range by using the operation button 105. Next, the processing proceeds to step S902.

At step S902, the CPU 202 determines whether the photographing button 103 has been pressed. In the case where the results of the determination indicate that the photographing button 103 has been pressed, the processing proceeds to step S903 and in the case where the photographing button 103 has not been pressed, the processing returns to step S901.

At step S903, the image processing unit 209 (the number of times of photographing/exposure time calculation unit 804) calculates the number of times of photographing and the exposure time for each photographing that are necessary at the time of actual photographing (details will be described later). Next, the processing proceeds to step S904.

At step S904, the image capturing apparatus 101 performs actual photographing based on the number of times of photographing and the exposure time calculated at step S903. In the actual photographing, the image capturing system control unit 205 acquires the amount of light of a subject by driving the optical unit 102, the A/D conversion unit 208 converts the acquired information on the light of the subject into RAW image data, and the RAW image data storage unit 301 stores the RAW image data. Next, the processing proceeds to step S905.

At step S905, the development processing unit 308 performs development processing on each piece of the RAW image data stored at step S904 in the RAW image data storage unit 301. The image data after the development is stored in the photographed image data storage unit 801. Next, the processing proceeds to step S906.

At step S906, the combination processing unit 803 performs combination processing (details will be described later) to combine photographed image data stored at step S905 in the photographed image data storage unit 801. The image data acquired as the result of the combination processing is stored in the output image data storage unit 306. Next, the processing proceeds to step S907.

At step S907, the display unit 104 displays the image data stored in the output image data storage unit 306. A user selects image data to be output based on the image data displayed on the display unit 104. Next, the processing proceeds to step S908.

At step S908, the image capturing apparatus 101 converts the image data displayed on the display unit 104 at step S907 into a file format such as Jpeg by the encoder unit 210 and outputs the image data to the PC/media 213 via the media I/F 211.

<Calculation of Number of Times of Photographing/Exposure Time>

Figure 10:
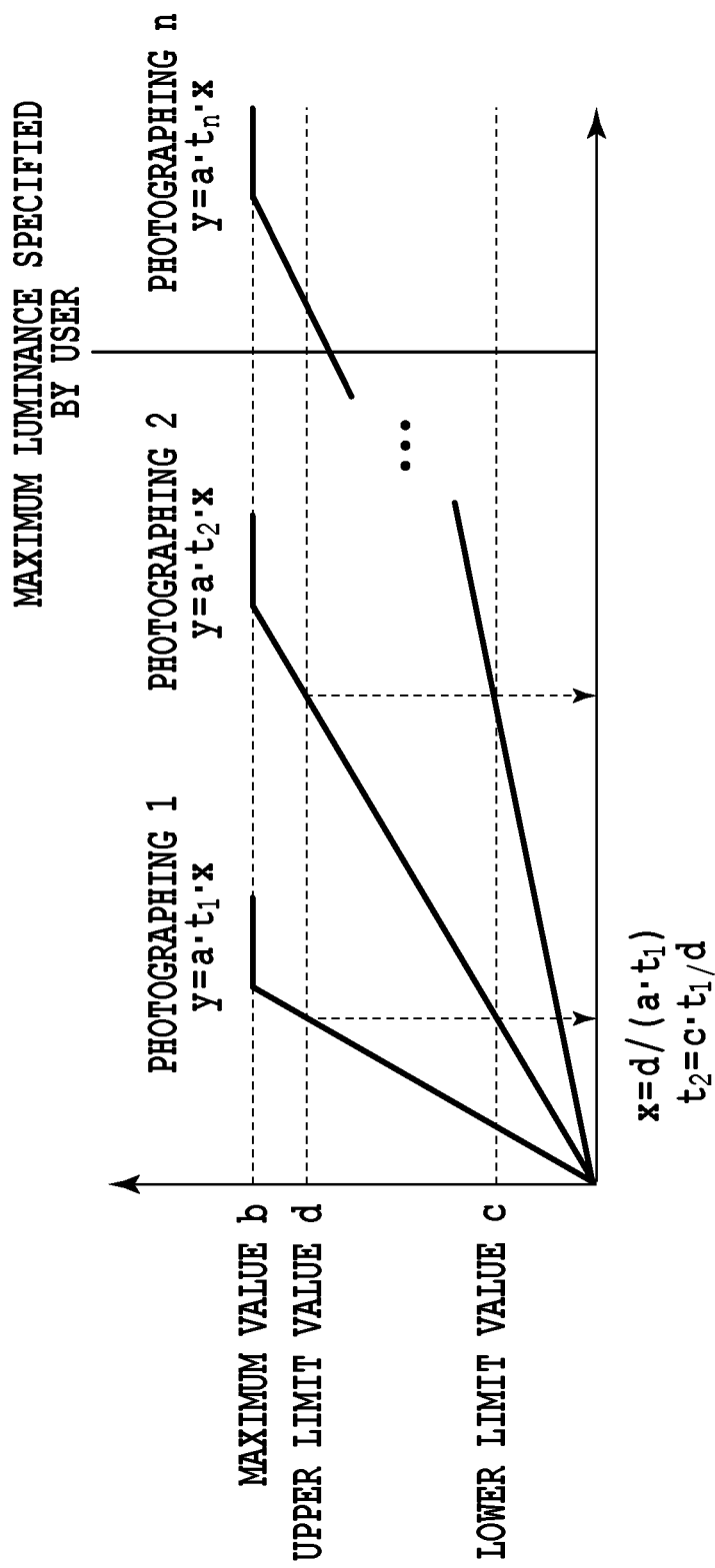
FIG. 10 is a diagram for explaining the number of times of photographing/exposure time calculation in the second embodiment.

The calculation of the number of times of photographing/exposure time at step S903 in FIG. 9 is explained by using FIG. 10. FIG. 10 is a diagram for explaining the calculation of the number of times of photographing/exposure time. As shown in FIG. 10, in order to acquire the maximum luminance specified by a user, it is necessary to perform photographing a plurality of times in the actual photographing at step S904. Because of this, the number of times of photographing and the exposure time of each photographing necessary to acquire the maximum luminance specified by a user are calculated.

In the case where the exposure time of the first photographing, expressed as photographing 1 in the present specification and FIG. 10 (as well as for the second photographing and subsequent photographing), is denoted by t1, a coefficient of conversion from luminance into an output pixel value is denoted by a, and the maximum value is denoted by b, a relationship between luminance x and an output pixel value y can be expressed by expression (12).

$$y = a \cdot t1 \cdot x (x < b/(a \cdot t1))$$

$$y = b (x \geq b/(a \cdot t1)) \qquad \text{expression (12)}$$

Similarly, in the case where the exposure time of photographing next to photographing 1, i.e., photographing 2 is denoted by t2, the relationship between the luminance x and the output pixel value y in the photographing 2 can be expressed by expression (13).

$$y = a \cdot t2 \cdot x (x < b/(a \cdot t2))$$

$$y = b (x \geq b/(a \cdot t2)) \qquad \text{expression (13)}$$

Here, in the case where the lower limit threshold value of the output pixel value is denoted by c and the upper limit threshold value is denoted by d (the lower limit threshold value c and the upper limit threshold value d are values below which and above which the linearity of the luminance response characteristics of the image capturing sensor will be lost), a relationship expressed by expression (14) holds because of the expression (12).

$$x \geq d/(a \cdot t1) \qquad \text{expression (14)}$$

The straight line of the photographing 2 passes through $(d/(a \cdot t1), c)$, and therefore, it is possible to find the exposure time t2 in accordance with expression (15) by using the expression (13) and the expression (14).

$$t2 = c \cdot t1/d \qquad \text{expression (15)}$$

Similarly, it is possible to find an exposure time tn of photographing n in accordance with expression (16) by using an exposure time tn−1 of photographing n−1.

$$tn = c \cdot tn-1/d \qquad \text{expression (16)}$$

The number n of times of photographing is the minimum n that satisfies expression (17).

$$\text{maximum luminance specified by a user} \geq d/(a \cdot tn) \qquad \text{expression (17)}$$

By the above calculations, the number n of times of photographing and the exposure times t1, t2, . . . , tn for each photographing are determined.

<Combination Processing>

Figure 11:
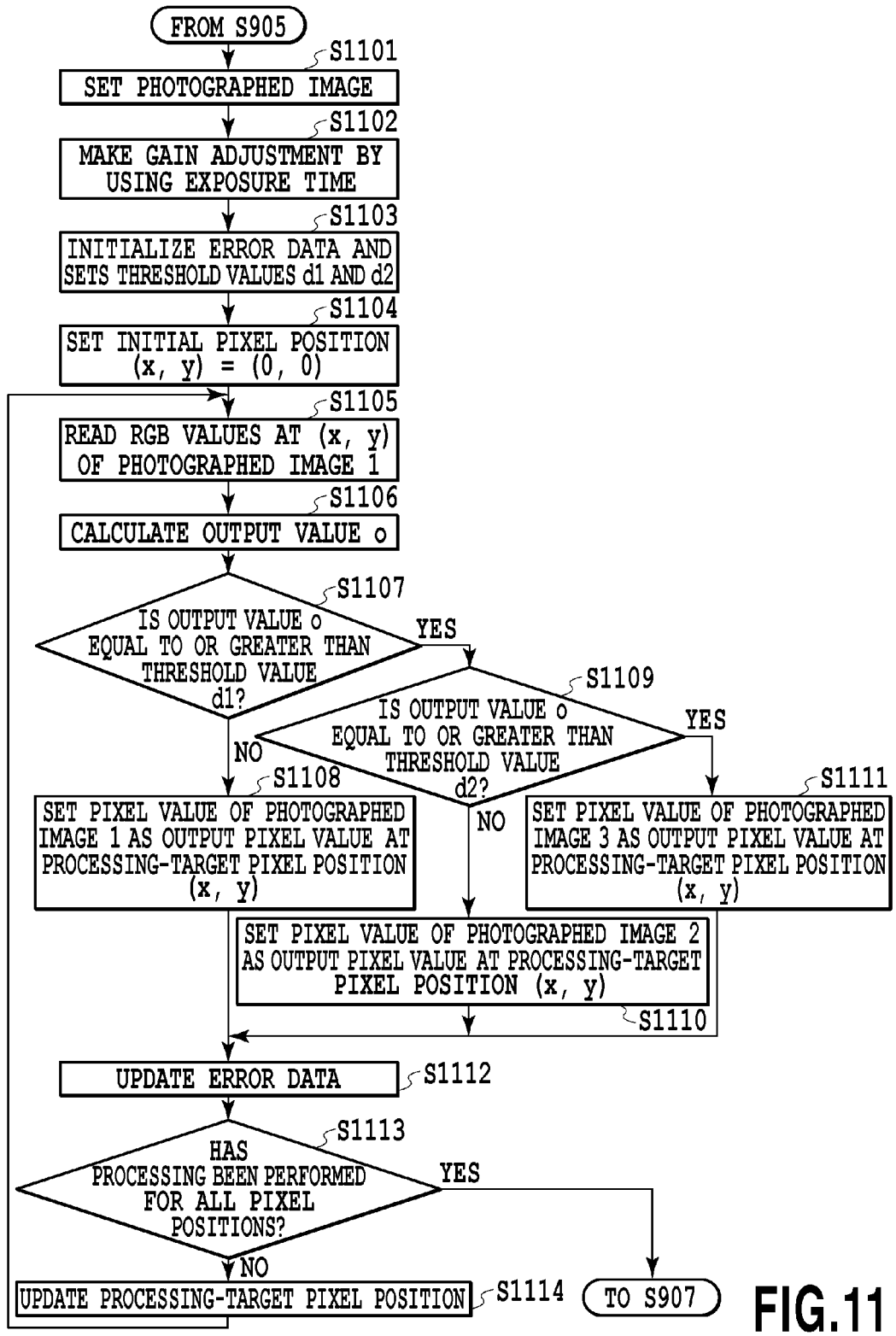
FIG. 11 is a detailed flowchart of combination processing in the second embodiment.
Figure 12:
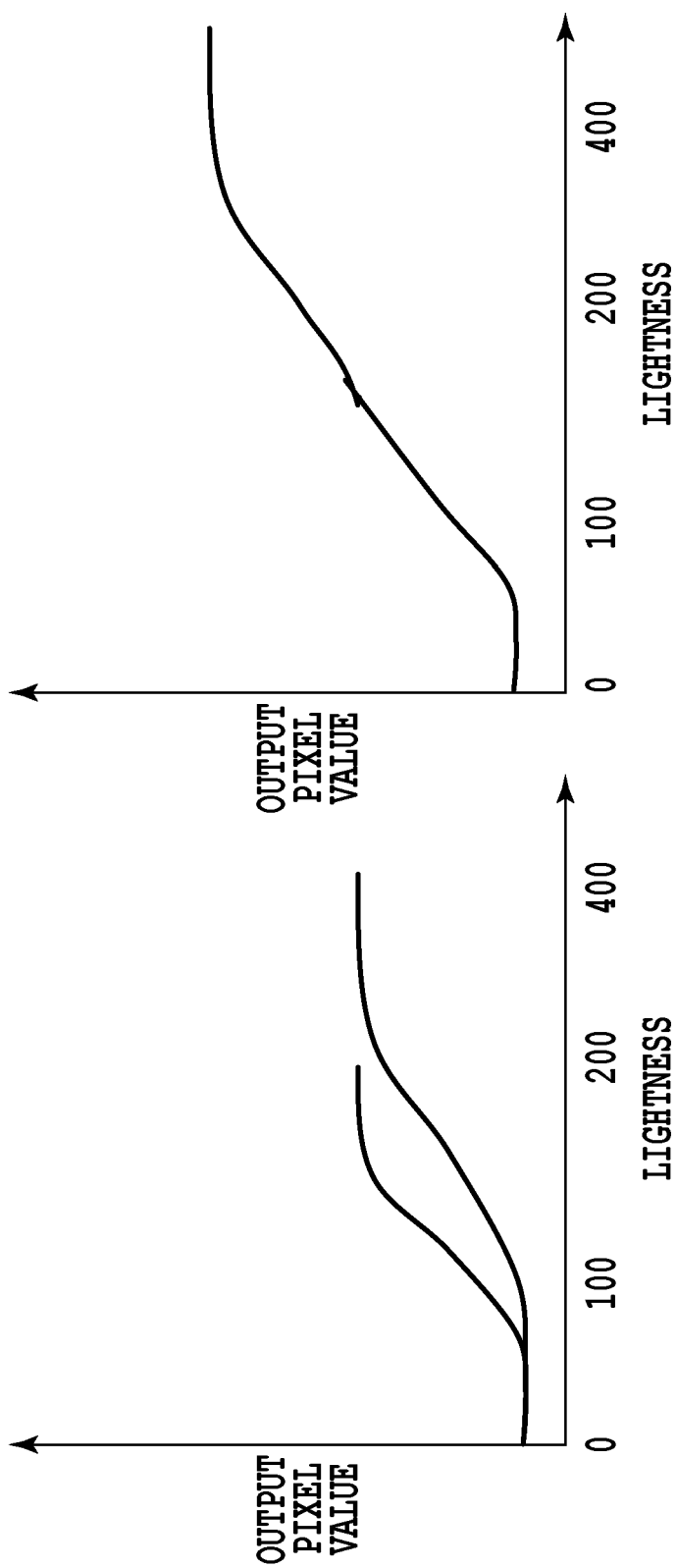
FIG. 12 is a diagram for explaining the cause of occurrence of a pseudo contour.

The combination processing at step S906 in FIG. 9 is explained by using FIG. 11. FIG. 11 is a detailed flowchart of the combination processing at step S906. For simplicity, explanation is given by using the case where the number of times of photographing calculated at step S903 is three, for example.

First, at step S1101, the combination processing unit 803 reads and sets the photographed image data stored in the photographed image data storage unit 801. Here, the photographed image data that is set is referred to as a photographed image 1, a photographed image 2, and a photographed image 3 in the order from the longest exposure time. Next, the processing proceeds to step S1102.

At step S1102, the image processing unit 209 (the gain adjustment processing unit 307) makes the gain adjustment by using exposure time data stored in the exposure time data storage unit 304. Next, the processing proceeds to step S1103.

At step S1103, the combination processing unit 803 initializes the error value Δ (x, y) constituting the error data and sets all the values to 0. Further, the combination processing unit 803 sets a threshold value d1 for switching between the photographed image 1 and the photographed image 2, and a threshold value d2 for switching between the photographed image 2 and the photographed image 3. Here, it is assumed that the threshold value d1 is 95% of the maximum output pixel value of the photographed image 1 and the threshold value d2 is 95% of the maximum output pixel value of the photographed image 2 after the gain adjustment. The maximum output pixel value of the photographed image refers to the maximum pixel value of the pixels in the photographed image. Next, the processing proceeds to step S1104.

At step S1104, the combination processing unit 803 sets (x, y)=(0, 0) as the initial pixel position of the processing-target pixel. Next, the processing proceeds to step S1105.

At step S1105, the combination processing unit 803 reads RGB values at (x, y) of the photographed image 1. Next, the processing proceeds to step S1106.

At step S1106, the combination processing unit 803 calculates the output value O in accordance with expression (18).

$$O=(4*R+3*R+B)/8+\Delta(x,y) \quad \text{expression (18)}$$

Here, in the expression (18), R, G, and B are RGB values at (x, y) of the photographed image 1, respectively, and $\Delta(x, y)$ is an error value at (x, y). Next, the processing proceeds to step S1107.

At step S1107, the combination processing unit 803 determines whether the output value O is equal to or greater than the threshold value d1 by comparing the output value O calculated at step S1106 and the threshold value d1. In the case where the results of the determination indicate that the output value O is equal to or greater than the threshold value d1, the processing proceeds to step S1109 and in other cases, the processing proceeds to step S1108.

At step S1108, the combination processing unit 803 sets the pixel value at (x, y) of the photographed image 1 as the output pixel value at the processing-target pixel position (x, y). Next, the processing proceeds to step S1112.

At step S1109, the combination processing unit 803 determines whether the output value O is equal to or greater than the threshold value d2 by comparing the output value O calculated at step S1106 and the threshold value d2. In the case where the results of the determination indicate that the output value O is equal to or greater than the threshold value d2, the processing proceeds to step S1111 and in other cases, the processing proceeds to step S1110.

At step S1110, the combination processing unit 803 sets the pixel value at (x, y) of the photographed image 2 as the output pixel value at the processing-target pixel position (x, y). Next, the processing proceeds to step S1112.

At step S1111, the combination processing unit 803 sets the pixel value at (x, y) of the photographed image 3 as the output pixel value at the processing-target pixel position (x, y). Next, the processing proceeds to step S1112.

At step S1112, the combination processing unit 803 updates the error data (details will be described later). Next, the processing proceeds to step S1113.

At step S1113, the combination processing unit 803 determines whether the processing at steps S1105 to S1112 has been performed for all the pixel positions. In the case where the results of the determination indicate that the processing at steps S1105 to S1112 has been performed for all the pixel positions, the processing proceeds to step S907 and in other cases, the processing proceeds to step S1114.

At step S1114, the combination processing unit 803 updates the processing-target pixel position. Next, the processing returns to step S1105. After this, the processing at steps S1105 to S114 is repeated for each processing-target pixel position until it is determined that the processing at steps S1105 to S112 has been performed for all the pixel positions at step S1113.

<Updating of Error Data>

The updating of the error data at step S1112 in FIG. 11 is explained. In the present processing, the error $\Delta d$ is calculated in accordance with the expression (2) in the first embodiment by using the output value O calculated at step S1106. Then, the updating of the error data is performed by diffusing the calculated error $\Delta d$ to the adjacent pixels in accordance with expression (19) to expression (22).

$$\Delta(x+1,y)+=7/16*\Delta d \quad \text{expression (19)}$$

$$\Delta(x-1,y+1)+=3/16*\Delta d \quad \text{expression (20)}$$

$$\Delta(x,y+1)+=5/16*\Delta d \quad \text{expression (21)}$$

$$\Delta(x+1,y+1)+=1/16*\Delta d \quad \text{expression (22)}$$

By performing the processing explained above, it is made possible to reduce the pseudo contour that occurs resulting from the nonlinear response to the luminance of a sensor at the time of acquiring HDR image data by performing photographing a plurality of times while varying the exposure time using a general image capturing sensor. Further, according to the present embodiment, it is possible to make the most use of the dynamic range of a sensor as shown in FIG. 10. As a result of this, it is made possible to perform photographing that requires the number of times of photographing be as small as possible and the number of kinds of photographing be as small as possible at the time of combining and acquiring the HDR image data by photographing a high dynamic range scene.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment (s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-056494, filed Mar. 19, 2014, which is hereby incorporated by reference wherein in its entirety.

What is claimed is:

1. A control apparatus for controlling an image capturing sensor, the control apparatus comprising:
  a processor; and
  a memory for storing instructions that, when executed by the processor, cause the processor and the memory to function as:
    a generation unit configured to selectively determine an exposure time from at least two or more different exposure times for each pixel constituting image data and to generate exposure time data indicative of an exposure time for each pixel; and
    a gain adjustment processing unit configured to make a gain adjustment to the image data based on the determined exposure time, wherein
  the generation unit calculates an output value from acquired image data, determines an exposure time for each pixel based on the calculated output value, calculates an error related to the calculated output value, and diffuses the calculated error to pixels adjacent to a processing-target pixel, thereby turning a pixel switching pattern into a blue noise pattern,
  the generation unit determines the exposure time for each pixel based on image data acquired by preliminary photographing that is performed before actual photographing and characteristics of the image capturing sensor,
  the generation unit calculates the output value from the image data acquired by the preliminary photographing, and
  the calculated error is a difference between the calculated output value and a threshold value that is a value at which luminance response characteristics of the image capturing sensor lose linearity.

2. The control apparatus according to claim 1, wherein the generation unit diffuses the calculated error by an error diffusion method.

3. A control method for controlling an image capturing sensor, the control method comprising:
  a step of selectively determining an exposure time from at least two or more different exposure times for each pixel constituting image data and generating exposure time data indicative of an exposure time for each pixel; and
  a step of making a gain adjustment to the image data based on the determined exposure time, wherein
  in the generating, an output value is calculated from acquired image data, an exposure time for each pixel is determined based on the calculated output value, an error related to the calculated output value is calculated, and the calculated error is diffused to pixels adjacent to a processing-target pixel, thereby a pixel switching pattern is turned into a blue noise pattern,
  in the generating, the exposure time is determined for each pixel based on image data acquired by preliminary photographing that is performed before actual photographing and characteristics of the image capturing sensor,
  in the generating, an output value is calculated from the image data acquired by the preliminary photographing, and
  the calculated error is a difference between the calculated output value and a threshold value that is a value at which luminance response characteristics of the image capturing sensor lose linearity.

4. A non-transitory computer readable storage medium storing a program for causing a computer to perform a method, the method comprising:
  a step of selectively determining an exposure time from at least two or more different exposure times for each pixel constituting image data and generating exposure time data indicative of an exposure time for each pixel; and
  a step of making a gain adjustment to the image data based on the determined exposure time, wherein
  in the generating, an output value is calculated from acquired image data, an exposure time for each pixel is determined based on the calculated output value, an error related to the calculated output value is calculated, and the calculated error is diffused to pixels adjacent to a processing-target pixel, thereby a pixel switching pattern is turned into a blue noise pattern,
  in the generating, the exposure time is determined for each pixel based on image data acquired by preliminary photographing that is performed before actual photographing and characteristics of the image capturing sensor,
  in the generating, the output value is calculated from image data acquired by the preliminary photographing, and
  the calculated error is a difference between the calculated output value and a threshold value that is a value at which luminance response characteristics of the image capturing sensor lose linearity.

* * * * *